United States Patent [19]

Wittman

[11] 3,766,323

[45] Oct. 16, 1973

[54] DIGITAL DIAL PULSE DISTORTION CORRECTOR

[75] Inventor: John P. Wittman, Raleigh, N.C.

[73] Assignee: International Telephone and Telegraph Corporation, Nutley, N.J.

[22] Filed: Feb. 24, 1971

[21] Appl. No.: 118,250

[52] U.S. Cl. ............ 179/16 E, 179/16 EA, 328/164

[51] Int. Cl. .......................... H04q 1/36, H04b 3/36

[58] Field of Search ...................... 179/16 E, 16 EA, 179/16 F, 15 AD, 175.2 R, 175.2 A, 16 EC; 307/265, 234; 328/37, 164

[56] References Cited

UNITED STATES PATENTS

| | | | |
|---|---|---|---|
| 3,601,709 | 8/1971 | Dyachkov et al. | 328/164 |
| 3,659,055 | 4/1972 | Witmore | 179/16 E |
| 3,504,290 | 3/1970 | Earle | 328/164 |
| 3,544,724 | 12/1970 | Pento | 179/16 E |
| 3,452,220 | 6/1969 | Fritschi | 179/16 E |
| 3,312,784 | 4/1967 | Draper, Jr. | 179/16 E |
| 3,092,691 | 6/1963 | Burns et al. | 179/16 EA |

*Primary Examiner*—Kathleen H. Claffy
*Assistant Examiner*—Randall P. Myers
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

Input dial pulses having a given range of break-to-make ratios and a given range of repetition rates and local clock pulses having a given repetition rate activate digital logic circuitry including a digital counting arrangement which is controllably shifted between two different counting rates to generate output dial pulses of constant break-to-make ratios.

8 Claims, 10 Drawing Figures

INVENTOR
JOHN P. WITTMAN
BY Alfred C. Hill
AGENT

INVENTOR
JOHN P. WITTMAN
BY Alfred C. Hill
AGENT

INVENTOR
JOHN P. WITTMAN
BY
Alfred C. Hill
AGENT

INVENTOR
JOHN P. WITTMAN
BY
Alfred C. Hill
AGENT

INVENTOR
JOHN P. WITTMAN
BY
Alfred C. Hill
AGENT

INVENTOR
JOHN P. WITTMAN
BY
Alfred C. Hill
AGENT

DIGITAL DIAL PULSE DISTORTION CORRECTOR

BACKGROUND OF THE INVENTION

This invention relates to telephone switching equipment and more particularly to dial pulse distortion correctors.

The most widely used type of telephone switching equipment requires, for optimum operation, control pulses, such as dial pulses, with a ratio of 60 percent break to 40 percent make. Distortion produced in interoffice transmission facilities may, however, result in wide variations in incoming pulse ratios. Pulse correctors of the prior art are employed that produce uniform pulses of the proper break-to-make ratios, from input dial pulses ranging from 10 to 90 percent break, at speeds of 8 to 14 pulses per second (pps).

Design specifications of pulses corrector to meet extreme operating requirements are as follows:

1. Operate over a wide range of input per cent break. (10 to 90 percent)
2. Give 60 percent break output over a range of speeds (8 to 12 pps)
3. Repeat ON-HOOK supervision as quickly as possible in order to permit fast release of the interoffice trunk.

Pulse correctors employed in the past have been of two primary types. The first type is a relay type pulse corrector but has a disadvantage of giving a constant break period regardless of the speed and the per cent break varies widely. The second type of pulse corrector, that will meet the above stated specifications, employs a resistor-capacitor charge circuit controllable between two different time constants to provide the design constant break-to-make ratios over the range of input per cent break and range of speeds mentioned hereinabove as the specification to be met by a pulse corrector.

SUMMARY OF THE INVENTION

An object of the present invention is to provide still another type of dial pulse distortion corrector.

Another object of the present invention is to provide an improved dial pulse distortion corrector that will meet and/or exceed the specification requirements set forth hereinabove under the heading "Background of the Invention."

Still another object of the present invention is to provide a digital dial pulse distortion corrector.

A feature of the present invention is the provision of a digital dial pulse distortion corrector to provide output dial pulses having a constant break-to-make ratio in response to input dial pulses having a given range of break-to-make ratio and a given range of repetition rates comprising a first source of the input dial pulses; a second source of clock pulses having a given repetition rate; and logic circuitry coupled to the first and second sources, the logic circuitry including digital counting circuitry having a controllable counting rate to control the generating of the output dial pulses.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

The following will be a discussion with respect to FIGS. 1–4 of the theory of operation of the digital dial pulse distortion corrector in accordance with the principles of the present invention.

Figures 1, 2, 3, 4:
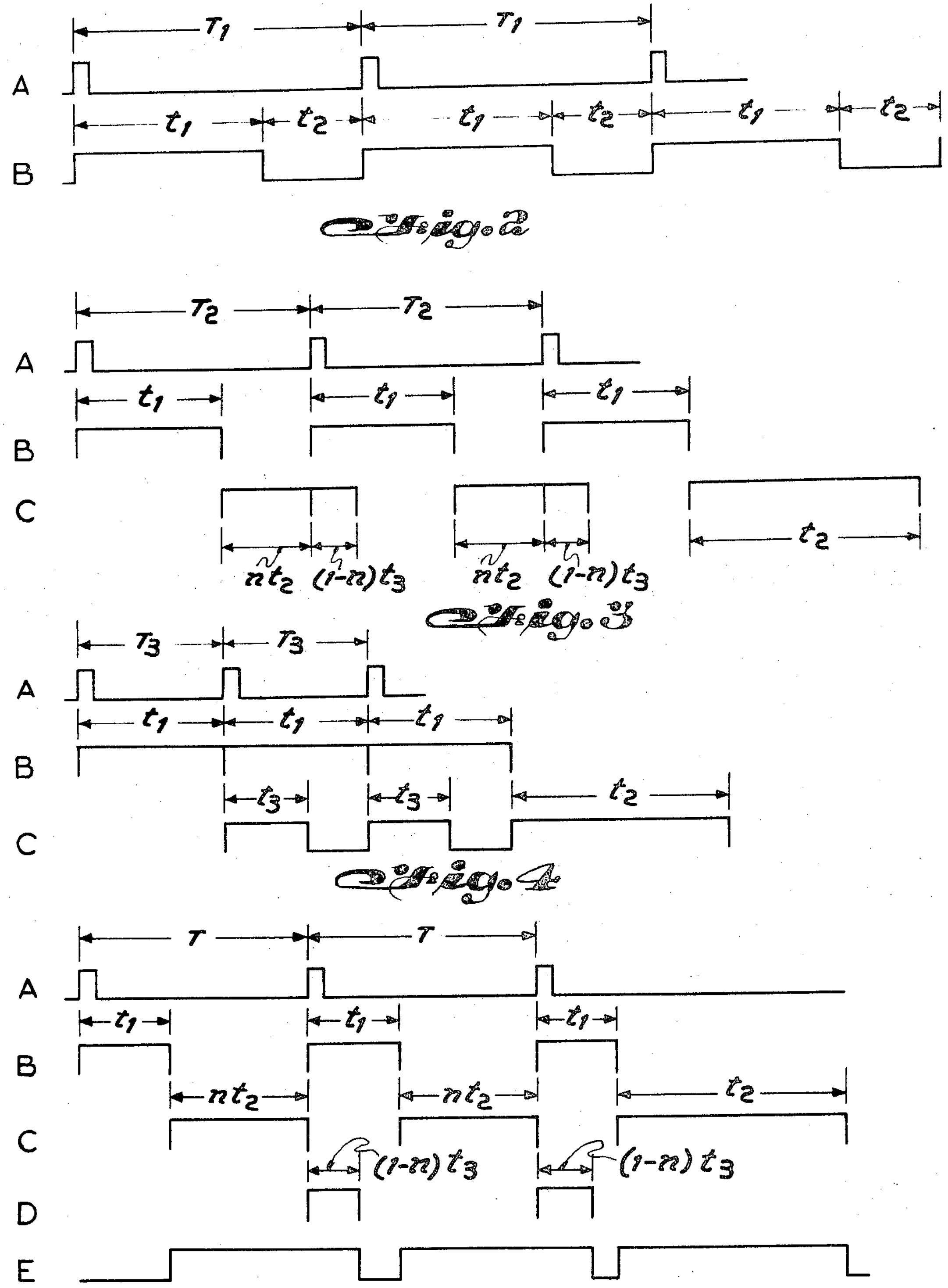
FIGS. 1–4 illustrate curves useful in explaining the theory of operation of the digital dial pulses distortion corrector in accordance with the principles of the present invention.

Consider first a positive M-lead pulse of period T1 as shown in Curve A, FIG. 1 and two time intervals $t1$ and $t2$ as shown in Curve B, FIG. 1. Time interval $t1$ starts on the leading edge of the M pulse and time interval $t2$ starts at the termination of time interval $t1$. Time intervals $t1$ and $t2$ are chosen such that $t1 + t2 = T1$ for the lowest dialing rate. For the desired 60 percent break let $t2 = 0.6T1$ and $t1 = 0.4T1$, where $t2$ = the break interval or the time in which a tone is generated. Thus, $$t2 = 1.5t1 \qquad 1$$

Now consider the situation where the M lead pulse has a period of $T2 \leq t1 + t2$ such as illustrated in Curve A, FIG. 2. Under this condition $T2 = t1 + nt2$, where $n$ ranges from 0 to 1. Now let t3 be another time interval $<t2$ and add $(1-n)\ t3$ to $t2$ as illustrated in Curve C, FIG. 2 and subtract $(1-n)t3$ from $t1$ of Curve B, FIG. 2 to obtain the desired 60 percent break.

Let us consider the limiting case where $T3 < T2 < T1$, $t3 = t1$, where $n=0$; $(1-n)\ t3 = t3$. FIG. 3 illustrates the situation where $T3 < T2 < T1$ and $$t3 = 0.6t1 \qquad 2$$

to achieve the desired 60 percent break. From equations (1) and (2) $t2 = 1.5\ t1$; $t3 = 0.6$ t1 and $t3/t2 = 0.4$
$t2/t3 = 2.5$
$t2/t3 = 2.5$ $$t1/t2 = 2/3 \qquad 3$$

For the situation where T ranges from T3 to T1, there is obtained the situation as shown in FIG. 4 wherein $t1 = \leq T \leq (t1 + t2) = t1 + nt2$, where $n$ ranges from 0 to 1 and the pulse output per period = 60 percent is provided by the following equation.

$$[nt2 + (1-n)\ t3/nt2 + t1] = 0.6 \qquad 4$$

From the equation (4) there is obtained $nt2 +(1-n)t3=0.6nt2+0.6t1$

Then dividing by $t2$ $\quad n + (1-n)\ t3/t2 = 0.6n + 0.6(t1/t2)$

Employing equations (3) $\quad n + (1-n)0.4 = 0.6n + 0.6 \times 2/3$

Then $n - 0.6n + 0.4(1-n) = 0.4$
Then $0.4n + 0.4(1-n) = 0.4$
Then $0.4(n+1 - n) = 0.4$ Then $n + 1 - n = 1$
For $n = 0$ $1 = 1$
For $n = 1$ $1 = 1$ Thus, this illustrates a check for the full range of $n$ from 0 to 1.

The conclusion that can be drawn from the above are that $t1 = 0.4T1$; $t2 = 0.6$ T1 and $t3 = 0.24I1$, where T1 = the period of the slowest dialing rate for which full correction is desired. For $T3 = t1 = 0.4T1$ = the period of the highest dialing rate for full correction = 2.5 times fastest dialing rate. For instance, for the range of dialing rates extending from 8 to 20 pps $t1 = 50$ milliseconds (ms) $t2 = 75$ ms and $t3 = 30$ms, where the ratio $t2/t3 = 2.5$: 1. A range of break inputs from (1 to 99) percent yields a 60 percent break output employing the times for $t1$, $t2$ and $t3$ set forth hereinabove. Curve E, FIG. 4 illustrates that the tone out or break condition is present during a time interval equal to the sum of the time interval of the $nt2$ pulse of Curve C, FIG. 4 and the time interval of the $(1-n)$ $t3$ pulse of Curve D, FIG. 4.

Employing the foregoing information there is set forth hereinbelow a TABLE illustrating the timing of the digital dial pulse corrector of the present invention for various input repetition rates to produce the desired 60 percent break.

TIMING FOR DIGITAL DIAL PULSE CORRECTOR TABLE

| pps | ms (n) (75) T-50 t2 | ms (1−n) (30) t3 | ms t2+t3 | ms T | % Break (t2+t3)/T | n |
|---|---|---|---|---|---|---|
| 8 | 75.00 | 0.00 | 75.00 | 125.00 | 0.6 | 1 |
| 9 | 61.11 | 5.56 | 66.67 | 111.11 | 0.6 | 0.815 |
| 10 | 50.00 | 10.00 | 60.00 | 100.00 | 0.6 | 0.667 |
| 11 | 40.91 | 13.64 | 54.55 | 90.91 | 0.6 | 0.545 |
| 12 | 33.33 | 16.67 | 50.00 | 83.33 | 0.6 | 0.444 |
| 13 | 26.92 | 19.23 | 46.15 | 76.92 | 0.6 | 0.359 |
| 15 | 16.67 | 23.33 | 40.00 | 66.67 | 0.6 | 0.222 |
| 17 | 8.82 | 26.47 | 35.29 | 58.82 | 0.6 | 0.118 |
| 19 | 2.63 | 28.95 | 31.58 | 52.63 | 0.6 | 0.029 |
| 20 | 0.00 | 30.00 | 30.00 | 50.00 | 0.6 | 0.000 |

Figure 5:
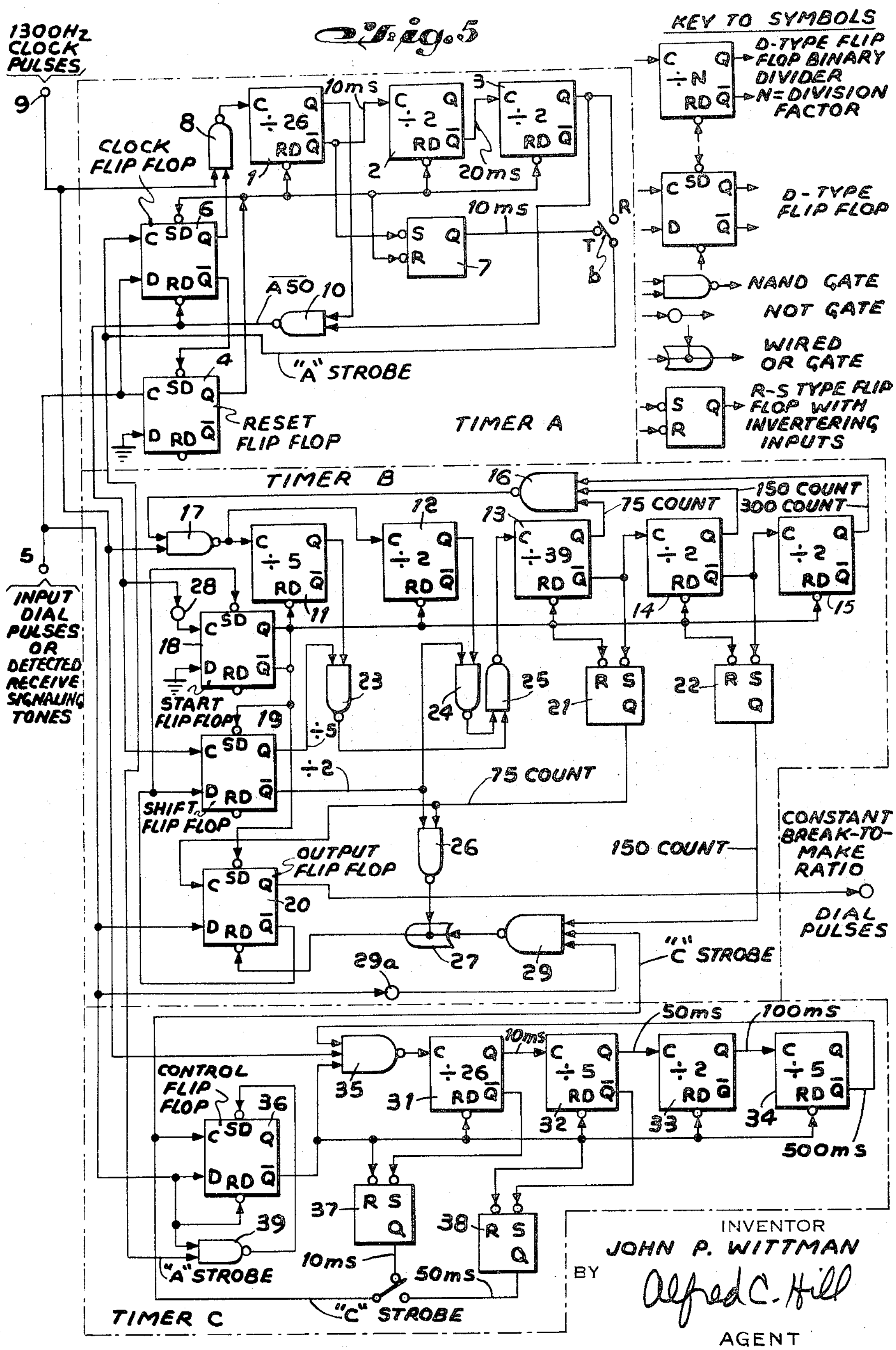
FIG. 5 is a block diagram of one embodiment of the digital dial pulse distortion corrector in accordance with the principles of the present invention.

Referring to FIG. 5, there is illustrated therein one embodiment of the digital dial pulse distortion corrector in accordance with the principles of the present invention. It should be kept in mind, however, that the clock pulse frequency and the division factors of the various dividing chains are only set forth for purposes of explanation. One skilled in the art can employ other clock pulse frequencies and appropriate division factors in the dividing chains to produce the desired output times and timing pulse widths to achieve the correction produced by the digital dial pulse distortion corrector in a manner disclosed herein. In addition specific types of flip flops (bistable devices) and logic gates are disclosed in the embodiment of FIG. 5. Here again it is well within the skill of those skilled in the art to accomplish the control pulse correction, as accomplished by the embodiment of FIG. 5, by employing other types of bistable devices and binary dividers and other types of logic gates.

The basic components of the digital dial pulse distortion corrector of the present invention are identified as timer A and timer B. Timer A includes therein a binary counter including counter stages 1, 2 and 3 employing therein D-type flip-flops and having the division ratios as illustrated. In addition, timer A includes a bistable device, such as reset flip flop 4 of the D-type, with its clock input C coupled to the input dial pulse source provided by terminal 5 and a second bistable device, such as clock flip flop 6 having its D input coupled to terminal 5. In addition, timer A includes a bistable device, such as the R-S type flip flop 7 having inverting inputs, to provide the transmit A strobe at a time delay of 10ms when switch $b$ is in the transmit (T) position. A receive A strobe at a time delay of 4 Oms is provided when switch $b$ is in the receive (R) position. A logic gate in the form of NAND gate 8 is coupled to the 1300 hertz (HZ) negative going (binary "1" to binary "0") clock pulses supplied from terminal 9. Gate 8 is under control of the Q output of flip flop 6 to supply clock pulses to be counted by the counting chain including dividers 1, 2 and 3. A logic gate, such as NAND gate 10, is couled to the Q output of divider 1 and the Q output of divider 3 to produce a timing signal having a width of 50ms which is employed in timer B to control the operation thereof and also as a direct reset for flip flop 6.

The operation of timer A is as follows. The positive going edge of the input dial pulse is coupled to the C input of flip flop 4 and produces a negative going reset output at the Q output of flip flop 4 as shown in Curve E, FIG. 6. This output resets dividers 1–3 and flip flops 6 and 7. At the same time flip flop 6 is triggered by the leading edge of the dial pulse on its D input to produce a binary "1" condition at its Q output which is applied to gate 8. Thus, gate 8 in conjunction with the negative going clock pulse from terminal 9 supplies clock pulses for counting to the input of divider 1. The output of flip flop 6 is shown in Curve G, FIG. 6. The counting action of dividers 1–3 are shown in Curves A, B and C of FIG. 6. Upon the occurrence a positive going transition at the output of divider 1 flip flop 7 produces the "A" strobe as shown in Curve D, FIG. 6. Gate 10 coupled to the Q output of divider 1 and the Q output of divider 3 produces an output pulse $\overline{A50}$ as shown in Curve F, FIG. 6. Upon the occurrence of the trailing edge of pulse $\overline{A50}$, flip flop 6 is triggered so as to provide a "0" binary condition at the Q output thereof to stop the passage of the clock pulses to the input of divider 1.

The A strobe, produced at 10ms for transmit and 40ms for receive, is coupled to the C input of flip flop 6 to enable flip flop 6 to ignore contact bounce on transmit or speech simulation of the signaling frequency on receive.

Figure 7:
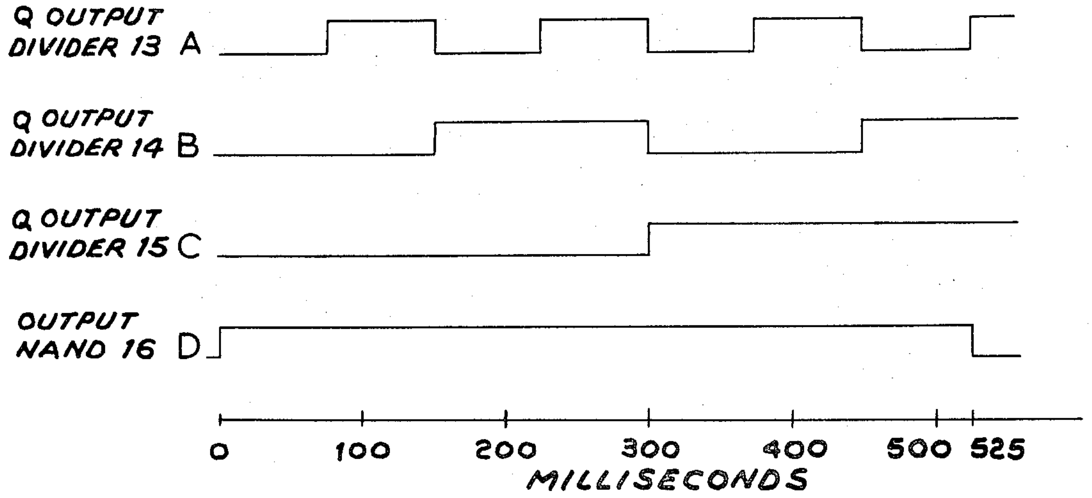

Turning now to timer B this timer includes a counter having a controllable counting rate which is controlled by coupling one or the other of the dividers 11 or 12 as the input to the counter which includes, in addition to the selected one of the input stages, dividers 13, 14 and 15. It will be noted that the Q outputs of dividers 13, 14 and 15 having a count of 75, 150 and 300, respectively, are coupled to NAND gate 16 which will produce a binary "1" condition for a period of 525ms as shown in Curve D, FIG. 7. The outputs of dividers 13, 14 and 15 are shown in Curves A, B and C, FIG. 7 respectively, to produce the output from gate 16 as shown in Curve D, FIG. 7. The output of gate 16 is coupled to NAND gate 17 which has its other input coupled to terminal 9, the clock pulse input. The output of gate 17, in the form of clock pulses, is coupled to the C input of both dividers 11 and 12. Timer B includes in addition to the above described counter, bistable devices, such as start flip flop 18, shift flip flop 19 and output flip flop 20. All of these flip flops are illustrated as being D-type flip flops. In addition, bistable devices, such as flip flops 21 and 22 of the R-S type having inverting inputs are coupled to the $\overline{Q}$ outputs of dividers 13 and 14 to provide a constant binary "1" condition after 75 count delay, and after a 150 count delay respectively.

Timer B also includes logic gates, such as NAND gates 23, 24 and 25, that are employed to determine under control of flip flop 19 which of the input dividers 11 and 12 are coupled to divider 13. In addition to these logic gates NAND gate 26 in conjunction with the wired OR gate 27 determine when flip flop 20 is reset to provide supervision functions.

The operation of timer B will now be described. The output of gate 10 of timer A is coupled to NOT gate 28 which clocks the Q output of flip flop 18 to a binary "0" condition which is used to reset dividers 11–15 and flip flops 19–22. Flip flop 18 is reset by the $\overline{Q}$ output of flip flop 20 going to a binary "0" condition. The shift flip flop 19 receives on its clock input C the output of gate 10 of a timer A and provides a binary "1" condition on its Q output when activated by the binary "0" condition on output Q of flip flop 18. This binary "1" condition from Q of flip flop 19 controls gate 23 which in conjunction with gate 25 provides clock pulses to divider 13 after division by a factor of five in divider 11. The binary "0" condition at output $\overline{Q}$ of flip flip 19 renders gate 24 inoperative and, therefore, input divider 12 is disconnected from the input of divider 13. When the output of gate 10, produced by the leading edge of the next adjacent dial pulse, is received at flip flop 19, flip flop 19 will switch so that its Q output will now be in a binary "0" condition and its $\overline{Q}$ output will now be a binary "1" condition. The Q output of flip flop 20 is still a binary "1" condition. In other words, the $\overline{Q}$ output of flip flop 20 coupled to the D input of flip flop 19 is a binary "0." Flip flop 19 will always revert to having a binary "1" condition on its Q output upon occurrence of a binary "0" condition at output Q of flip flop 18.

Flip flop 20 upon occurrence of the binary "0" condition from the Q output of flip flop 18 will provide a binary "1" condition at its Q output and will remain there until gate 26 provides a reset output through gate 27. This will occur when a binary "1" condition is present at the Q output of flip flop 21 and a binary "1" condition is present from the $\overline{Q}$ output of flip flop 19. Should the counting chain of timer B not be in a divide by two condition and there is a binary "0" condition at terminal 5, in other words no dial pulses or ON-HOOK supervisory condition, the Q output of flip flop 21 after a 75 count will be in a binary "1" condition. Thus, flip flop 20 will be reset to provide a binary "0" condition output at its Q output , since the Q output of flip flop 21 is coupled to the C input of flip flop 20.

One other condition will cause output flip flop 20 to be reset to provide binary "0" condition on its Q output and this occurs during a long extended period of time when there has been and ON-HOOK supervisory condition which provides a binary "1" condition at terminal 5. If this condition has been present longer than a 150 count and then becomes a "0", NAND gate 29 will receive a binary "1" input from flip flop 22, a binary "1" condition for the C strobe of timer C (10 or 40 ms after the "1" to "0" transition of terminal 5 for transmit or receive function respectively) and a "0" condition from terminal 5 through NOT gate 29, thus, a "1" input to gate 29. Under these conditions, the operation of flip flop 20 will be terminated following the OFF-HOOK supervisory condition.

Strobe C is produced in timer C by a third counting arrangement including dividers 31, 32, 33 and 34. NAND gate 35 controls the coupling of the clock pulses from terminal 9 to the input of divider 31 which receives its other inputs from the $\overline{Q}$ output of divider 34 and the $\overline{Q}$ output of a bistable device, such as control flip flop 36. Flip flop 36 produces a "0" output at its $\overline{Q}$ output for resetting binaries 31–34 and flip flops 37 and 38 which provide the transmit and receive C strobes, respectively. Flip flop 36 is activated by the trailing edge (negative going) of the dial pulses. The C strobe will continue as long as the input from terminal 5 is a binary "0" condition. The clock pulses to the divider will be stopped and, thus, the C strobe is stopped if the condition at terminal 5 is a binary "1". Flip flop 36 is reset by NAND gate 39 when there is simultaneously present a binary "1" condition from terminal 5 and a binary "1" condition for strobe A.

Figure 8:
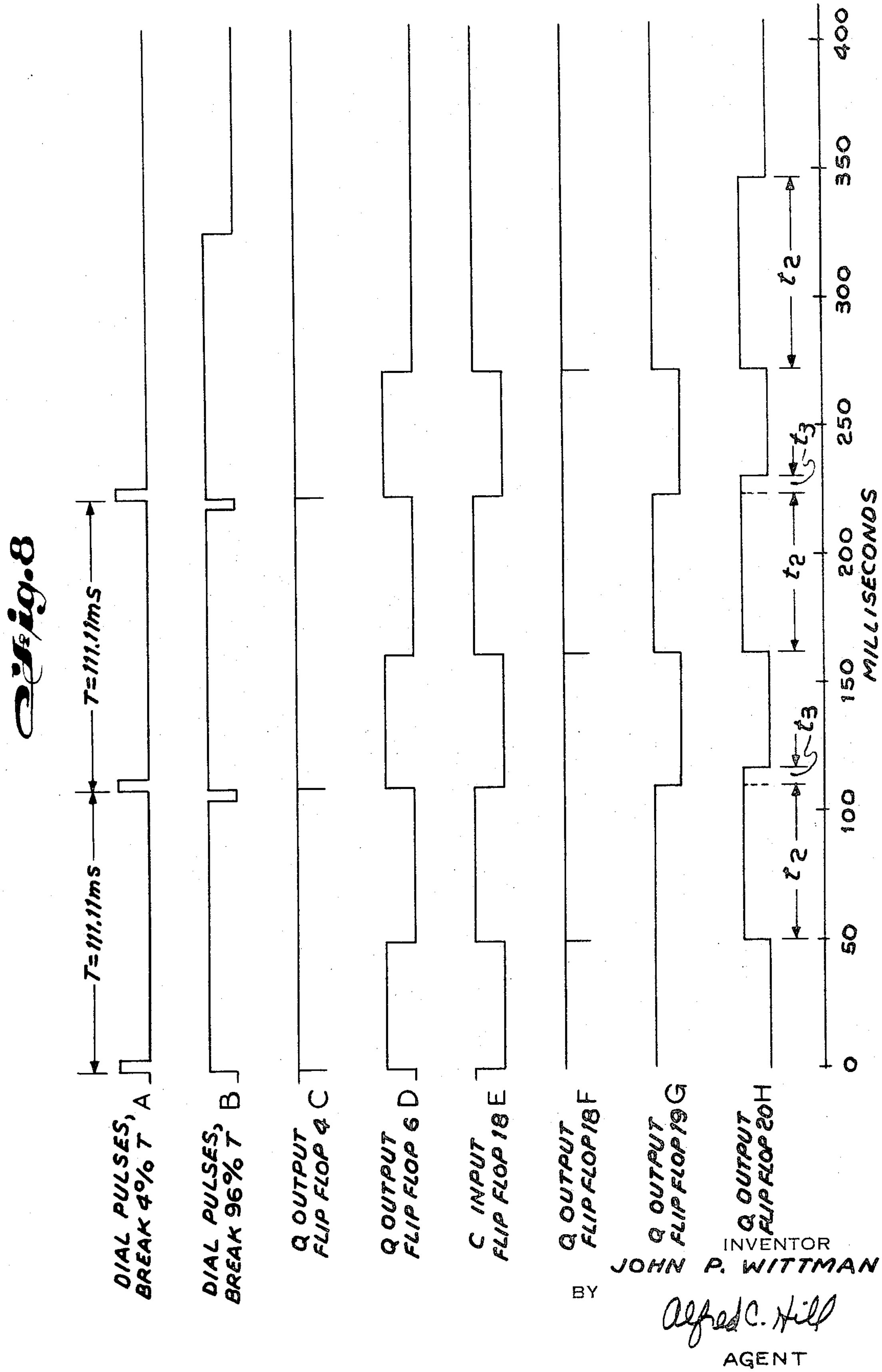

FIG. 8 illustrates a condition where the repetition rate of the dial pulses is 9pps with a period T = 111.1ms. Curves A and B, FIG. 8 show two different percentages of break for the input dial pulses at terminal 5. It will be noted that since timers A and B operate on the leading edge of a dial pulse that the width of the dial pulses (the break percent) is inconsequential and, therefore, the circuitry of FIG. 5 will operate in the same manner for both a 4 percent break and a 96 percent break.

Figure 6:
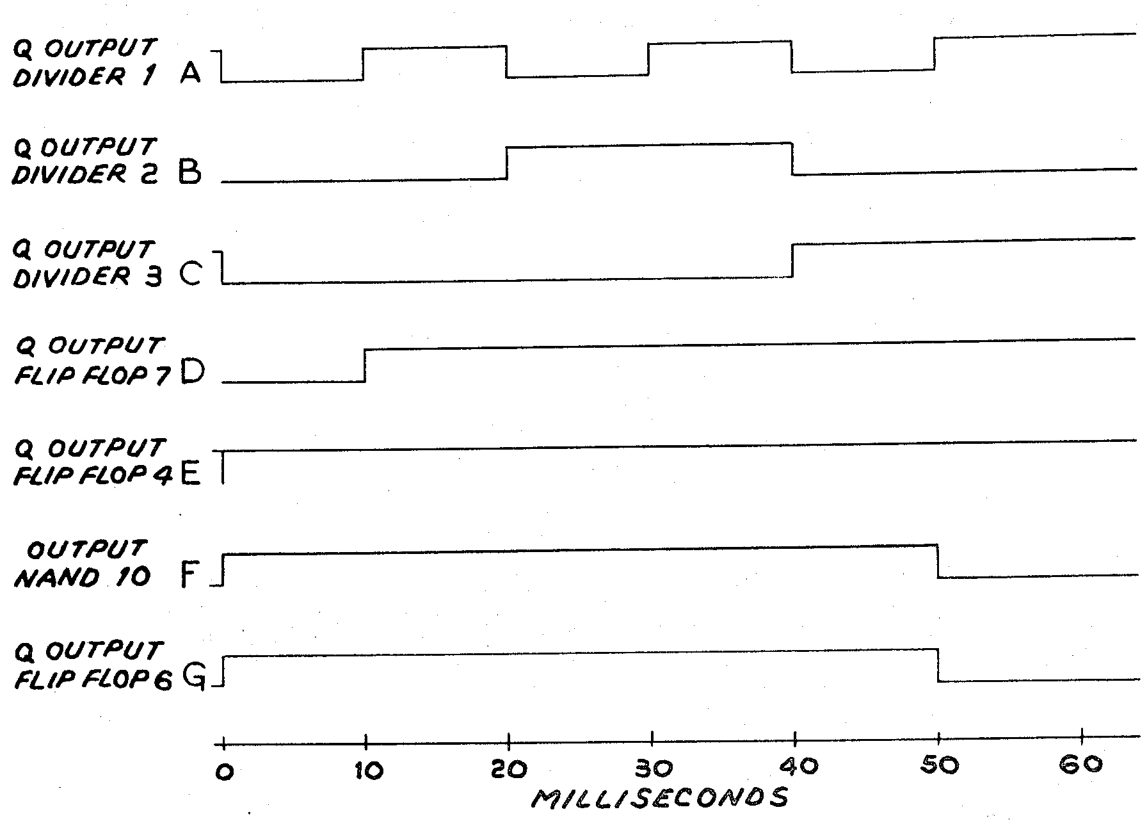
FIGS. 6–10 are timing diagrams useful in explaining the operation of the digital dial pulse distortion corrector of FIG. 5.

The leading edge of the first dial pulse causes a binary "0" output of flip flop 4 as illustrated in Curve C. This output will occurr in flip flop 4 for each of the dial pulses. Curve D, FIG. 8 represents the Q output of flip flop 6 which goes to a "1" condition simultaneously with the occurrence of the leading edge of each dial pulse and returns to a binary "0" condition 50ms under control of gate 10. Curve D is also the curve for the output of gate 10 as illustrated in FIG. 6. This output is inverted in gate 28 as illustrated in Curve E and is applied to the C input of flip flop 18.

After a delay of 50ms, as provided by the output of gate 10, flip flop 18 will produce a binary "0" condition at its Q output to start the operation of the B timer. Simultaneously, output flip flop 20, as illustrated in Curve H will go to a binary "1" condition. Flip flop 19 is already in a binary "1" condition and will remain there until the next adjacent clock pulse at which time the $\overline{Q}$ output of flip flop 19 becomes a binary "1" condition and the counting rate will shift to a divide by two counting rate, a faster counting rate. Up to this time due to the condition of flip flop 19 the counter of timer B has been counting at a divide by five rate, the slower counting rate, and contributed the pulse *t2* to the output of flip flop 20. When the counter of timer B has shifted to the faster rate that portion of the desired 60 percent break will be made up by the pulse *t3* which is added to the pulse *t2* and is terminated through means of gates 26 and 27 upon occurrence of the 75 count binary "1" condition from flip flop 21 and the binary "1" condition on the $\overline{Q}$ output of flip flop 19. Thus, there is produced during an occurrence of the dial pulses the desired constant break-to-make ratio dial pulses due to the shifting of counting rate of the counter of timer B. After the last dial pulse, flip flop 20 will be activated to provide a binary "1" condition at its Q output 50ms after the occurrence of the leading edge of the last dial pulse due to the output from gate 10. Flip flop 20 will stay in this binary "1" condition and the counter of timer B will stay in a divide by five count condition until a 75 count has been reached at which time flip flop 21 provides a binary "1" condition for application to the C input of flip flop 20 which then resets the Q output of flip flop 20 to a binary "0" condition.

Figure 9:
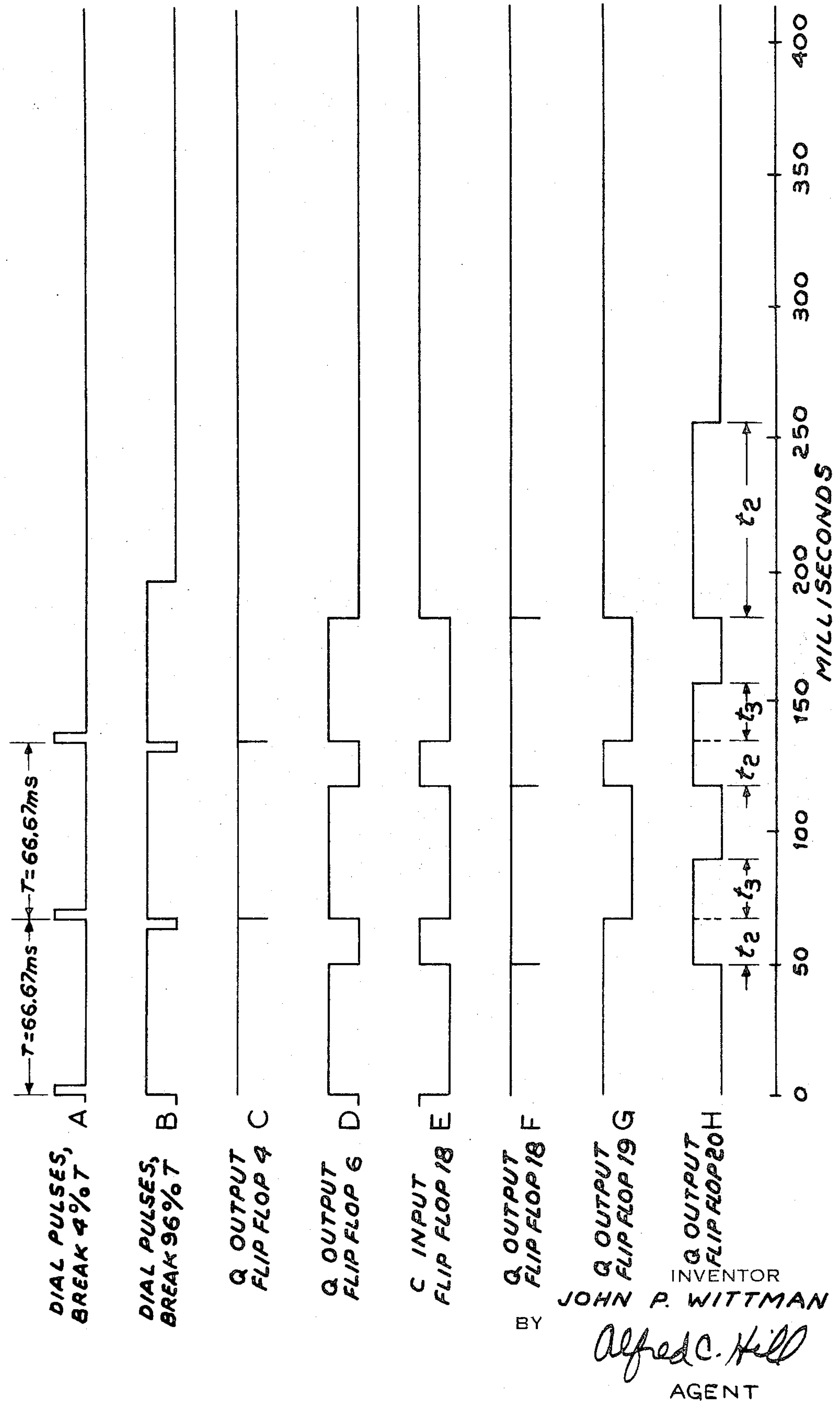

Referring to FIG. 9, a timing diagram is illustrated therein for dial pulses having a repetition rate of 15pps and a period T = 66.67ms. The circuitry of FIG. 5 operates in the same manner as described with reference to FIG. 8, namely, that output flip flop 20 has a binary "1" condition on its Q output at the termination of the $\overline{A50}$ pulse from gate 10 and flip flop 19 will have a binary "1" output on its $\overline{Q}$ output upon the occurrence of the next adjacent dial pulse which occurrs earlier in time than the situation illustrated in FIG. 8. As a consequence the counter of timer B will count for a shorter period of time at a divide by five rate and have a longer period of timer at a divide by two rate to provide the illustrated durations of pulses *t*2 and *t*3 to provide the desired 60 percent break for the output dial pulses.

Figure 10:
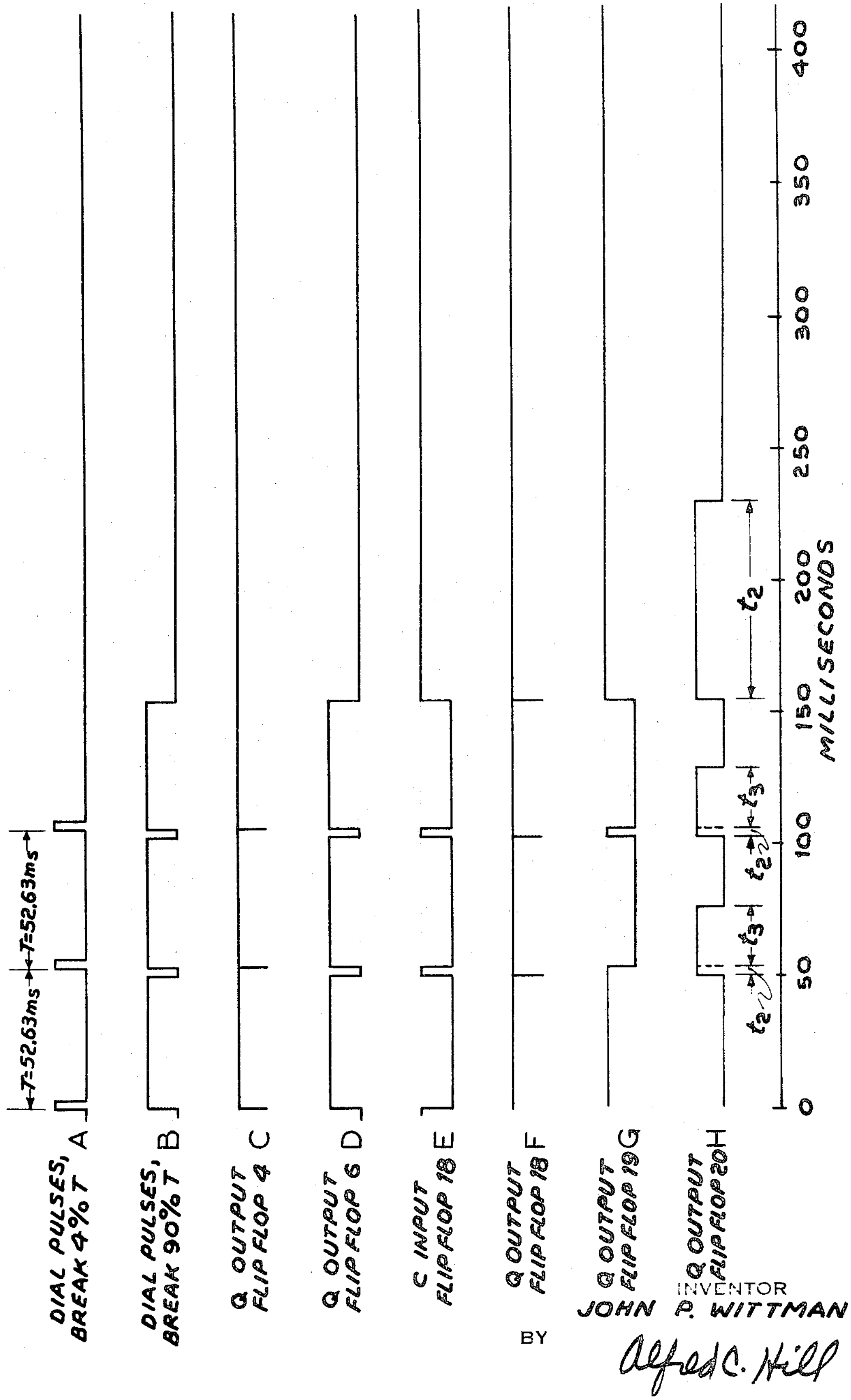

Referring to FIG. 10, there is illustrated therein the situation where the input dial pulses are at a 19pps repetition rate having a period T = 52.63ms. Here again the components of FIG. 5 operate in the same manner as described with reference to FIG. 8. However, due to the fact that shift flip flop 19 is switched to the divide by two rate earlier than in either of the situations of FIGS. 8 and 9 only a small amount of the 60 percent break output from flip Flop 20 is contributed by the divide by five rate of the counter of timer B and a large amount of the 60 percent break output of flip flop 20 is contributed when the counter of timer B is operating at a divide by two rate.

While I have described above the principles of my invention in connection with specific apparatus it is to be more clearly understood that this description is made only by way of example and not as a limitation to the scope of my invention as set forth in the objects thereof and in the accompanying claims.

I claim:

1. A digital dial pulse distortion corrector to generate output dial pulses having a constant break-to-make ratio in response to input dial pulses having a given range of break-to-make ratios and a given range of repetition rates comprising:
   - a first source of said input dial pulses;
   - a second source of clock pulses having a given repetition rate; and
   - logic circuitry coupled to said first and second sources to control the generation of said output dial pulses;
   - said logic circuitry including
     - a first binary counter coupled to said second source,
     - a first logic circuit coupled to said first binary counter and said first source responsive to the leading edge of said input dial pulses to control the operation of said first binary counter and to produce a first control signal having a given width,
     - a second binary counter coupled to said second source, said second binary counter having a controllable counting rate, and
     - a second logic circuit coupled to said first source, to said first logic circuit and to said second binary counter, said second logic circuit being responsive to said leading edge of said input dial pulses and said first control signal to generate said output dial pulses and to control the counting rate of said second binary counter said second binary counter controlling the generation of said output dial pulses.

2. A dial pulse corrector according to claim 1 wherein
   - said second binary counter has two different counting rates, and
   - said second logic circuit includes
     - a pair of interconnected bistable means coupled to said first source, to said second binary counter and to said first logic circuit, said pair of bistable means being responsive to said first control signal being time coincident with one of said input dial pulses to set said second binary counter to the slower of said two counting rates and being responsive to said first control signal being time coincident with another of said input dial pulses immediately adjacent said one of said input dial pulses to set said second binary counter to the faster of said two counting rates.

3. A dial pulse corrector according to claim 1, wherein
   - said first binary counter includes
     - a first binary divider having a first given division factor to produce a binary "1" condition after a first given time delay, and
     - a second binary divider having a second given division factor coupled to said first binary divider to produce a binary "1" condition after a second given time delay; and
   - said first logic circuit includes
     - a first bistable device coupled to said first source responsive to the leading edge of said input dial pulses to produce a binary "1" condition,
     - a second bistable device coupled to said first source, said first bistable device and said first and second binary dividers to reset said first bistable device and said first and second binary dividers upon occurrence of the leading edge of said input dial pulses,
     - a first logic gate coupled to said second source, said first bistable device and said first binary divider to control the coupling of said clock pulses to said first binary divider, and
     - a second logic gate coupled to said first binary divider and said second binary divider to produce said first control signal having said given width equal to the sum of said first and second time delays,
     - said first control signal being coupled to said first bistable device to maintain said binary "1" condition thereof until the end of said given width.

4. A dial pulse corrector according to claim 3, wherein
   - said first and second binary dividers includes D-type flip flops;
   - said first and second bistable devices each include a D-type flip flop; and
said first and second logic gates each include
a NAND gate.

5. A dial pulse corrector according to claim 3, wherein
said second binary counter includes
a third binary divider having a third given division factor to provide a slow counting rate,
a fourth binary divider having a fourth given division factor to provide a fast counting rate, and
a fifth binary divider having a fifth given division factor to produce a binary "1" condition after a first given count; and
said second logic circuit includes
a third logic gate coupled to said secound source, said fifth binary divider and said third and fourth binary divider,
a third bistable device coupled to said second logic gate responsive to said first control signal to produce a first counting rate control signal upon occurrence of the time coincidence of said first control signal and one of said input dial pulses and a second counting rate control signal upon occurrence of the time coincidences of said first control signal and another of said input dial pulses immediately adjacent to said one of said input dial pulses,
a fourth bistable device coupled to said first source,
a fifth bistable device coupled to said second logic gate, said third and fourth bistable devices and said third, fourth and fifth binary dividers responsive to the complement of said first control signal to reset said third and fourth bistable devices and said third, fourth and fifth binary dividers,
a fourth logic gate having its output coupled to the input of said fifth binary divider,
a fifth logic gate having its output coupled to one input of said fourth logic gate, one input coupled to said third binary divider and its second input coupled to said third bistable device responsive to said first counting rate control signal,
a sixth logic gate having its output coupled to a second input of said fourth logic gate, one input coupled to said fourth binary divider and its second input coupled to said third bistable device responsive to said second counting rate control signal, and
a seventh logic gate coupled to said fifth binary divider, said fourth bistable device and said third bistable device responsive to said second counting rate control signal to control said fourth bistable device to produce said output dial pulses.

6. A dial pulse corrector according to claim 5, wherein
said third, fourth and fifth dividers includes
D-type flip flops;
said third, fourth and fifth bistable devices each include
a D-type flip flop; and
said third, fourth, fifth, sixth and seventh logic gates each include
a NAND gate.

7. A dial pulse corrector according to claim 5, wherein
said first source further provides in the absence of said input dial pulses
a binary "1" condition for a period of time greater than a given period of time;
said second binary counter further includes
a sixth binary divider having a sixth given division factor to produce a binary "1" condition after said given period of time; and
further including
a third logic circuit including
a sixth bistable device coupled to said first source responsive to the trailing edge of said input dial pulses,
an eighth logic gate coupled to said sixth bistable device, said first source and one of said first and second binary divider responsive to the trailing edge of said input dial pulses and the binary "1" condition after one of said first and second time delays,
a ninth logic gate coupled to said sixth bistable device and said clock pulses,
a seventh binary divider having a seventh given division factor to produce a binary "1" condition after a selected time delay, and
a tenth logic gate having its inputs coupled to said sixth binary divider, said seventh binary divider and said first source and its output coupled to said fourth bistable device to reset said fourth bistable device after said given period of time.

8. A dial pulse corrector according to claim 7, wherein
said sixth and seventh binary dividers include
D-type flip flops;
said sixth bistable device includes
a D-type flip flop; and
said eighth, ninth and tenth logic gates each include
a NAND gate.

* * * * *